United States Patent Office 3,140,239
Patented July 7, 1964

3,140,239
MICROBIOLOGICAL OXIDATION OF KOJIC ACID TO COMENIC ACID
Fred W. Tanner, Jr., Brookfield, Wis., and Joseph L. Sardinas, Gales Ferry, Conn., assignors to Chas. Pfizer & Co., Inc., New York, N.Y., a corporation of Delaware
No Drawing. Filed Sept. 26, 1962, Ser. No. 226,442
4 Claims. (Cl. 195—30)

This application is concerned with a method for the preparation of comenic acid. More particularly, it is concerned with a process for the production of comenic acid from kojic acid by microbiological means.

Comenic acid,

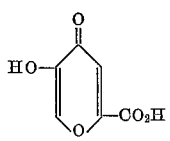

as is disclosed in the pending patent application of B. E. Tate and R. L. Miller, Serial No. 171,732, filed February 7, 1962, and assigned to the asignee of the present application, is an important and valuable intermediate in the production of maltol, a gamma-pyrone particularly useful for its flavor- and aroma-enhancing properties. As is disclosed in the said copending application, comenic acid can be made from kojic acid, an economical and readily available gamma-pyrone, by a chemical oxidation of the methylol group at the 2-position as, for example, with oxygen in the presence of noble metal catalysts at an alkaline pH range. With respect to the microbiological oxidation of kojic acid to comenic acid, however, at the present stage of development in the art, only one, commercially infeasible, procedure has been described. In volume 24, Bull. Agr. Chem. Soc. Japan, pages 741–742, 1960, Nonomura et al. report the preparation of comenic acid, in what is indicated to be trace amounts, from kojic acid after conducting the fermentation in the presence of an unidentified bacterium isolated from a soil sample. Although quantitative yields cannot be calculated from the data presented therein, it is concluded, in view of the recovery procedure described, that the yields were extremely low. The fact that substantial quantities of unoxidized kojic acid had to be recovered by means of solvent extraction at neutral pH, prior to extraction of the product at an acid pH strongly indicates that the percent conversion to comenic acid was very low.

Among the advantages which would accrue from employment of a commercially-feasible microbiological oxidation process are: elimination of the necessity for employing expensive noble metal, e.g., platinum and palladium, catalysts, elimination of the processing expenses involved in recovery of these valuable catalysts and elimination of extraordinary precautions sometimes necessary to prevent poisoning of the catalysts by certain undesirable materials such as sulfur compounds.

It has now been discovered that kojic acid can be oxidized to comenic acid on a commercially-feasible scale by microbiological means. Prior to this discovery, a number of microorganisms including bacteria, Actinomyces, yeasts and fungi were tested for comenic acid-producing ability and showed either no oxidizing ability or the formation of comenic acid in no more than the trace amount reported by Nonomura. Now, certain organisms have been found which effect this conversion in yields of up to 50 to 80% based on kojic acid.

The instant invention, therefore, contemplates a process for the preparation of comenic acid from kojic acid, which process comprises cultivating under submerged aerobic conditions a comenic acid-producing species selected from the group consisting of the genus Fusarium and the genus Absidia in an aqueous nutrient medium comprising kojic acid, a source of nitrogen, a source of carbon and a source of minerals.

The organisms which are employed in the process of the instant invention are selected from the group consisting of certain members of the genus Fusarium and certain members of the genus Absidia; the said groups comprise yeast-like fungi. Among the named species which are characterized in having this ability the following may be mentioned:

*F. moniliforme*
*F. tritecinctum*
*F. lateritium*
*F. oxysporum*
*F. solani*
*F. niveum*
*F. vasinfectum*
*A. glauca*
*A. repens*
*A. orchidis*
*A. spinosa*
*A. coerulea*

A number of strains of these species are publicly available in culture collections, both in the United States and abroad. The following is a partial list of such cultures: *F. moniliforme*, QM 654, ATCC 12776, QM 653, QM 556; *F. oxysporum*, QM 656, ATCC 9848; *F. solani* QM 106F, CMI 47163; *A. repens*, NRRL 1338; *A. orchidis*, ATCC 6647; *A. coerulea*, NRRL 1312.

ATCC=American Type Culture Collection, Washington, D.C.
NRRL=Northern Regional Research Laboratory, Peoria, Illinois.
QM=Quartermaster Culture Collection, U.S. Army, Natick, Mass.
CMI=Commonwealth Mycological Institute, Kew, Surrey, England.

In addition, strains of some of these species are maintained at the Centraalbureau voor Schimmelculture, Baarn, Holland, and in many other public culture collections.

Among the organisms which can be employed in the process of the instant invention, two strains may be specifically mentioned as leading to the highest conversions of kojic acid to comenic acid. These are *F. lateritium*, ATTC 14720 and *F.* sp., ATCC 14719.

It is to be understood that for the production of comenic acid according to the present invention, limitation to the aforesaid organisms is not intended. It is specifically desired and intended to include subcultures, natural mutants, transduced derivatives, variants, and the like, as well as mutants artificially produced from the aforesaid organisms by various means such as irradiation with X-rays or ultraviolet light, treatment with nitrogen mustards, and the like. In addition, it is, of course, anticipated and contemplated that other species of the genera Fusarium and Absidia may be found to possess the ability to effect, in high yield, the conversion of kojic acid to comenic acid and that certain strains within the said species may be found to be somewhat more efficient than others. Furthermore, in at least one of the strains of Fusarium, two distinct cell types have been found, one of which oxidizes kojic acid, and one of which does not. Therefore, a method for classifying organisms with respect to comenic acid-producing ability is essential to the selection of an active colony and such a method is described hereinafter.

The production of comenic acid is effected by the cultivation of one of the comenic acid-producing organisms in aerated deep-tank, i.e., submerged, fermentation. As is obvious to those skilled in the fermentation art, control of certain conditions will afford highest yields. For example, the fermentation is best conducted at pH values of from about 2 to about 10, and it is preferred to employ values between about 3.5 and about 7. Although the temperature is not critical to the process best results are usually obtained between about 25° and about 40° C., and a temperature of from about 25° to about 35° C. is preferred. In general, from one to about four days are required to obtain the best yields and from about 65 to about 90 hours is found most suitable.

A source of nitrogen, which may be organic or inorganic, is essential to the growth of the organism. Substances which are suitable nitrogen sources include ammonia, urea, and amino acids, such as tyrosine and p-hydroxyphenylglycine, or their hydrohalide salts. An economical source of amino acids is hydrolyzed protein which contains appreciable amounts of amino acids, and commercially available fish meal products and hydrolyzed casein products containing about 6–7% of amino nitrogen are found to be particularly suitable for obtaining the desired conversions. For best yields of product, concentrations of fish meal or of casein hydrolyzate from about one to about 20 g./liter of fermentation medium are usually employed and preferably from two to ten g./liter.

A source of carbon is also necessary for the growth of the organism. If an organic nitrogen source is employed, this substance may also fulfill the role of the carbon source. In addition, auxiliary carbon sources may sometimes be beneficial although these are by no means essential. Auxiliary sources of carbon which are found to be suitable include glycerol, glucose, sucrose, lactose, maltose, mannitol and sorbitol.

It is often beneficial to furnish other growth factors, which are contained in yeast extract, to the organism. The yeast extract is suitably added to the fermentation medium at a concentration of from about 0.5 to about 25 g./liter.

The concentration of kojic acid is not critical for this reaction, but from about 1 to about 100 g./liter of the fermentation medium will usually be employed and preferably from about 5 to about 20 g./liter. While the kojic acid may be added to the fermentation vessel at the same time the inoculum is added, it is preferred to delay the addition until growth of the organism is well under way. This inoculum is grown for 24 hours, then kojic acid is fed, conveniently as a non-sterile dry powder.

A source of minerals, including potassium and magnesium salts, is also necessary for the growth of the organism. These are frequently present as naturally occurring constituents of some of the other ingredients, such as casein hydrolysate. This source is often adequate, but may be supplemented by addition of salts, such as the phosphates or sulfates, of these metals. The various trace metals, including iron and copper, may be added separately to the nutrient medium in the form of their salts, or incorporated by employing tap water, which already contains such salts, for the preparation of the growth medium.

For the successful operation of the novel process of this invention it is, of course, essential to employ a comenic acid-producing organism. Organisms are tested and classified for this ability in the following manner: the proposed organism is rinsed from an agar slant under sterile conditions into a previously sterilized medium. This medium is to be one which conforms to the compositions outlined above as suitable for the reaction. For example, the medium may have the following composition:

|  | G./liter |
|---|---|
| Glucose (Cerelose) | 50 |
| Hydrolyzed casein | 10 |
| Yeast extract | 5 |
| $CaCO_3$ | 1 |

After the addition of the organism, the inoculum is maintained at about 28° C. with agitation for a period of 24 hours. During this period air may be supplied by diffusion, as for example, through a cotton plug, or by forced aeration.

The preformed inoculum prepared as described is transferred to a fermentation vessel and is grown for an additional 24 hours in a larger quantity of a medium of identical composition. At the end of this period, kojic acid is added to the fermentation vessel as a dry powder; the concentration of kojic acid employed for this purpose is 10 grams/liter.

At the conclusion of a 68 hour incubation period, the broth is filtered and a portion of the filtrate is applied to a strip of paper. From about 5 to about 40 microliters of broth is usually sufficient. A chromatogram is then developed, according to the procedure well known to those skilled in the art of paper chromatography, employing the solvent system: chloroform, ethanol, formic acid in the proportions 2:1:2 by volume. The developed chromatogram is viewed on a scanner with an ultraviolet source then is treated with diazonium fluoroborate reagent and examined for the reddish spots characteristic of kojic acid and of comenic acid. The spots are accurately located for the respective acids by simultaneously developing other paper strip chromatograms prepared from samples of pure kojic and pure comenic acids. When the aforementioned procedure is employed, those organisms which are suited to the practice of this invention by virtue of their comenic acid-producing ability are readily detected by the appearance of the characteristic spot in the developed chromatogram of the broth.

In addition to establishing the comenic acid-producing ability of the organisms, the size of the spot may be employed in a semi-quantitative fashion to estimate the comenic acid content of broths at various stages of incubation and to select the optimum time for halting the reaction and isolating the product. Ordinarily, the reaction will be continued until a concentration of at least about 0.1 g. per liter of product is attained.

The product, comenic acid, may be isolated from the filtered broth by standard procedures such as ion-exchange methods well known to those skilled in the art. Thus, comenic acid can be absorbed on an anion exchange resin of a polystyrene quaternary ammonium-type, for example, by passing the broth through a bed of said resin and the product can later be liberated as its salt by treating the absorbate with a dilute aqueous solution of alkali metal hydroxide. Acidification and concentration of the eluate affords crystalline comenic acid of high purity.

Alternatively, it is particularly convenient to recover comenic acid from the filtered fermentation broth simply by concentrating the broth, previously adjusted to a pH of about 2 by the addition of an acid such as hydrochloric acid, to about ⅙ the original volume, then cooling the suspension of product crystals to 5° C. and collecting the comenic acid by filtration. As will be exemplified in detail hereinafter, the product can be purified further by recrystallization from an appropriate solvent such as methanol.

The comenic acid prepared by employing one of the comenic acid-producing organisms under the conditions described is particularly suitable for use in the preparation of maltol by the process disclosed and claimed in pending patent application Serial No. 171,732, filed February 7, 1962, and assigned to the assignee of the instant application.

The following examples are given by way of illustration and are not to be construed as limitations of this invention, many variations of which are possible within the scope and spirit thereof.

*Example 1*

Fusarium sp., ATCC 14719, is rinsed from an agar slant under sterile conditions into a flask containing one liter of the following aqueous inoculum medium, previously sterilized in an autoclave at 20 lbs. per square inch steam pressure for one hour:

| | G./liter |
|---|---|
| Glucose (Cerelose) | 50 |
| Fish meal | 10 |
| Dried brewers' yeast | 5 |
| CaCO₃ | 1 |

The inoculum is maintained at 28° C. with shaking for 48 hours.

A basal medium is prepared for the actual production of comenic acid. This medium has the same composition as the medium in which the inoculum is prepared.

Two liters of the above medium is sterilized in an autoclave at 20 lbs. per square inch for one hour. 100 ml. of the incubated inoculum is added to two liters of the basal medium in a fermentation vessel having a total volume of four liters. Incubation is conducted at 28° C. with stirring at the rate of 1750 r.p.m. and with aeration at the rate of one-half volume of air per volume of reaction mixture per minute. After 24 hours, a luxuriant growth of the Fusarium is observed and 10 g./liter of crystalline kojic acid is added. The fermentation is continued for an additional 44 hours and a sample of the broth is withdrawn and the comenic acid content is estimated by paper chromatography with the solvent system: chloroform, ethanol, formic acid in the proportions 2:1:2 parts by volume. The developed chromatogram is examined under a scanner and ultraviolet light source then is treated with diazonium fluoroborate reagent and the reddish colored spots are observed. Comenic acid is distinguished from other spots by its characteristic position. No kojic acid remains and an amount of comenic acid equivalent to 5.3 g./liter of broth is present.

The broth is acidified to pH 2 by addition of 12 N hydrochloric acid solution, is treated with about 20 grams of infusorial earth and is filtered. The broth filtrate is evaporated in vacuo to a volume of 200 ml., and the syrup which results is cooled to 5° C. and maintained at this temperature for 16 hours. The light tan crystalline material which precipitates is recovered by filtration, is washed with a small amount of acetone and is air-dried. The comenic acid thus obtained can be converted to maltol by means of the process disclosed and claimed in pending patent application, Serial Number 171,732.

*Example II*

Fusarium lateritium, ATCC 14720, is rinsed into 100 ml., of the following sterilized aqueous inoculum medium:

| | G./liter |
|---|---|
| Glucose (Cerelose) | 50 |
| NZ-amine B | 10 |
| Yeast extract | 5 |
| CaCO₃ | 1 |

The inoculum is maintained at 28° C., with shaking, for 48 hours.

Two liters of the same sterilized medium in a fermentation vessel is treated with the incubated inoculum and incubation is continued at 28° C., with stirring at 1750 r.p.m. and with aeration at the rate of ½ volume of air per volume of broth per minute, for an additional 24 hours. Kojic acid is next added to a concentration of 5 g./liter and the fermentation is continued for an additional 76 hours.

The broth is then harvested and filtered and, after adjustment to pH 2 with 50% aqueous hydrochloric acid, it is extracted twice with equal volume of ethyl acetate. The extracts are combined and the solvent is removed by distillation in vacuo. The crude comenic acid which remains as a residue is dissolved in 4 parts by weight of boiling methanol, the solution is treated with decolorizing carbon, is filtered while hot and is allowed to cool. The crystalline comenic acid which forms is removed by filtration.

*Example III*

Fusarium sp., ATCC 14719, is rinsed into one liter of the following sterilized aqueous inoculum medium:

| | G./liter |
|---|---|
| Glucose (Cerelose) | 50 |
| NZ-amine B | 20 |
| Brewers' dried yeast | 15 |
| CaCO₃ | 1 |

The inoculum is maintained at 28° C. with shaking for 48 hours, and 100 ml. of the incubated inoculum is added to 2 liters of the same sterilized medium in a fermentation vessel. Fermentation is continued under the conditions of Example I for 24 hours whereupon kojic acid (10 g./liter) is added. After an additional 24 hours under the same conditions, an additional 10 g./liter of kojic acid is added. Fermentaiton is continued for an additional 20 hours (68 hours total) then the broth is analyzed and found to contain comenic acid at a concentration of 11 g./liter. The comenic acid is recovered from the harvested fermentation broth by the procedure of Example I.

*Example IV*

The procedure of Example I is repeated, substituting for Fusarium sp., ATCC 14719, *Absidia repens*, NRRL 1338, and increasing the amount of fish meal in the medium from 10 g./liter to 20 g./liter. After 68 hours only a trace of kojic acid remains unoxidized and the comenic acid is isolated, in good yield, as described in the said Example.

The procedure is repeated substituting for *Absidia repens*, *Absidia orchidis*, ATCC 6647; substantially the same results are obtained.

*Example V*

The procedure of Example I is followed, substituting for Fusarium sp., ATCC 14719, the following microorganisms:

*F. moniliforme*
*F. tritecinctum*
*F. lateritium*
*F. oxysporum*
*F. solani*
*F. niveum*
*F. vasinfectum*
*A. glauca*
*A. spinosa*
*A. coerulea*

The comenic acid which is obtained in good yield, is isolated as in Example I.

What is claimed is:

1. A process for the preparation of comenic acid from kojic acid which process comprises cultivating under submerged aerobic conditions a comenic acid-producing species selected from the group consisting of the genus Fusarium and the genus Absidia in an aqueous nutrient medium comprising kojic acid, a source of nitrogen, a source of carbon and a source of minerals.

2. A process as in claim 1 wherein said comenic acid-producing species is Fusarium sp., ATCC 14719.

3. A process as in claim 1 wherein said comenic acid-producing species is *Fuarium lateritum*, ATCC 14720.

4. A process for the preparation of comenic acid from kojic acid which process comprises cultivating under submerged aerobic conditions an organism selected from the group consisting of *Fusarium moniliforme, F. tritecinctum, F. lateritium, F. oxysporum, F. solani, F. niveum, F. vasinfectum, Absidia glauca, A. repens, A. orchidis, A. spinosa* and *A. coerulea*, in an aqueous nutrient medium comprising kojic acid, a source of nitrogen, a source of carbon, and a source of minerals.

References Cited in the file of this patent

Nonomura et al.: Agr. Chem. soc. Japan, volume 24, 1960, pages 741–742. (Copy in POSL.)